(No Model.)  3 Sheets—Sheet 1.

J. A. BRILL & W. S. ADAMS.
MOTOR TRUCK.

No. 538,948.  Patented May 7, 1895.

Witnesses:
C. W. Benjamin
M. F. Daly

Inventors:
John A. Brill &
Walter S. Adams,
by Joseph L. Levy
Attorney

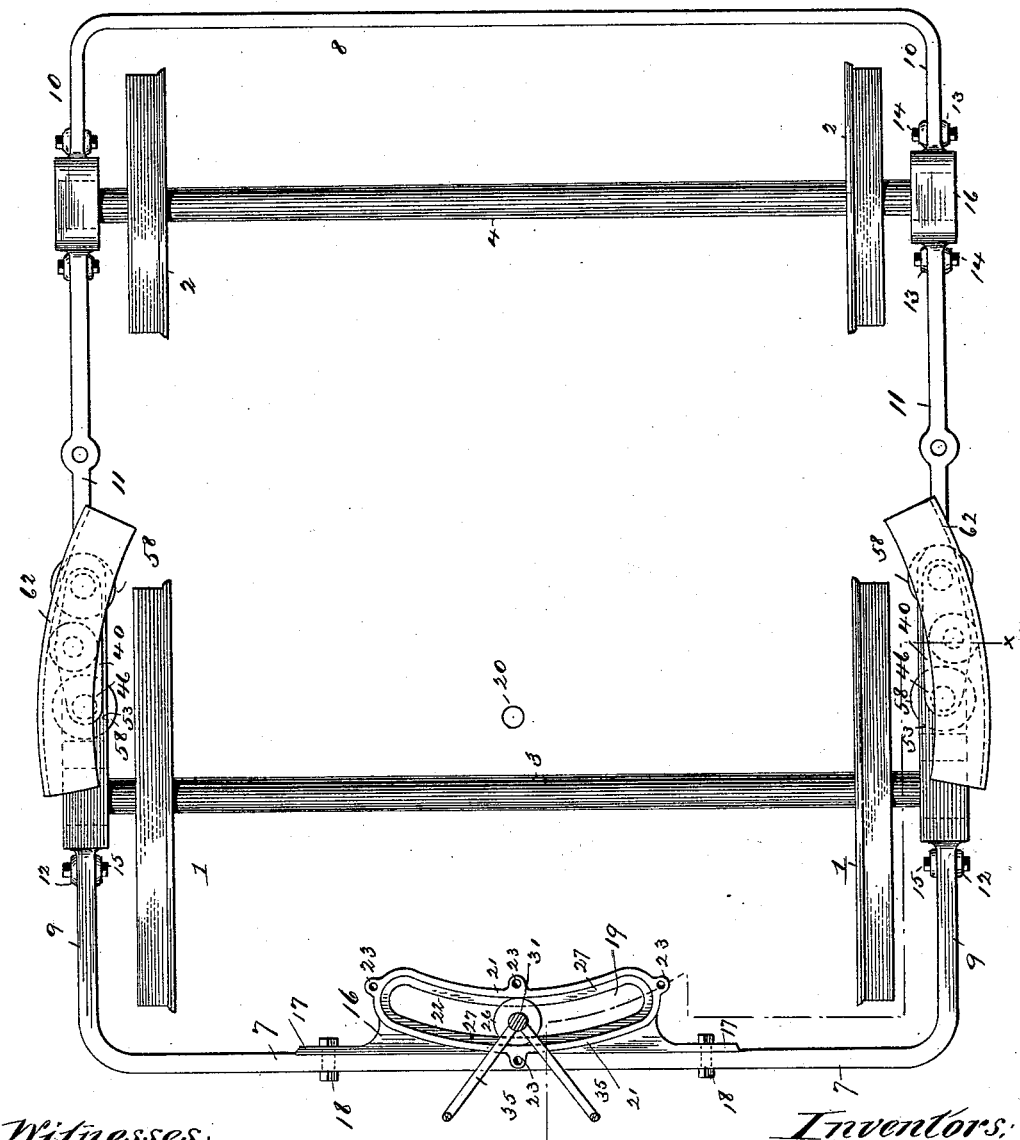

(No Model.) 3 Sheets—Sheet 3.
J. A. BRILL & W. S. ADAMS.
MOTOR TRUCK.
No. 538,948. Patented May 7, 1895.
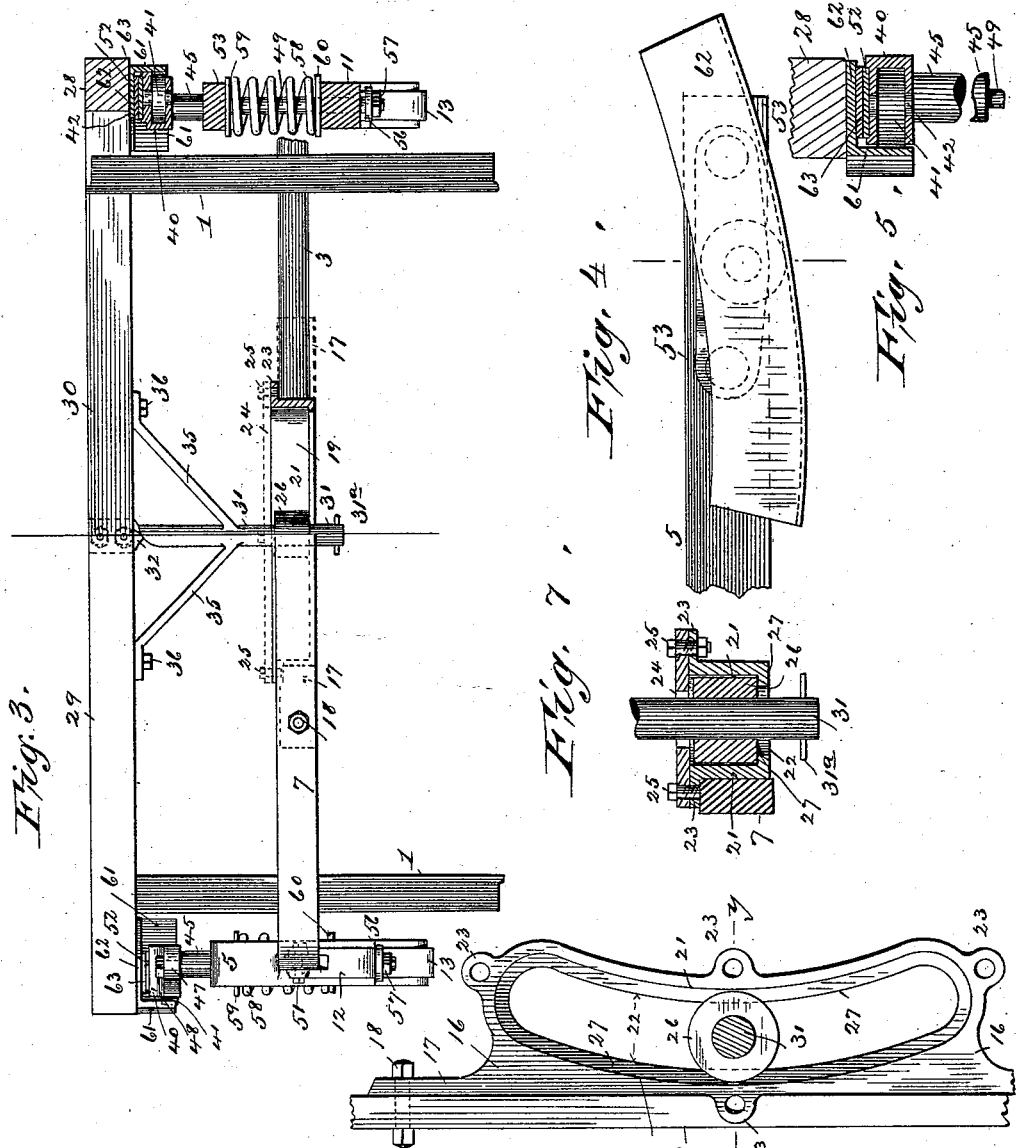
Witnesses:
C. W. Benjamin,
M. F. Daly.
Inventors:
John A. Brill &
Walter S. Adams.
by Joseph L. Levy
Attorney.

UNITED STATES PATENT OFFICE.

JOHN A. BRILL AND WALTER S. ADAMS, OF PHILADELPHIA, PENNSYLVANIA; SAID ADAMS ASSIGNOR TO SAID BRILL.

MOTOR-TRUCK.

SPECIFICATION forming part of Letters Patent No. 538,948, dated May 7, 1895.

Application filed February 17, 1893. Serial No. 462,730. (No model.)

*To all whom it may concern:*

Be it known that we, JOHN A. BRILL and WALTER S. ADAMS, citizens of the United States, residing at Philadelphia, in the county of Philadelphia and State of Pennsylvania, have invented new and useful Improvements in Motor-Trucks, of which the following is a specification.

Our invention relates to that class of trucks used on electric railways wherein each truck is to carry a motor, the special use of the truck being two under each car.

So far as we are now aware, the prior practice has been, in forming a drawing or pivotal connection between the car and truck, to connect the car body and truck through the instrumentality of a centrally located bolster and male and female pivot plates, the bolster being mounted in a resilient way in a portion of a truck frame generally composed of a plurality of braces and tying connections, or which carry pedestals or housings for the axle boxes, the bolster taking the motion of the car on the truck. In this form of connection the strain of drawing the car or truck is taken primarily on the center bearing, and from there transferred through the medium of the bolster to the truck frame, and thence to the pedestals or housings of the axle boxes. In this form of truck, or connection, the propelling force is not transferred directly from the car to the axles of the truck, when the power is applied to the car body, or from the truck frame to the car body when the power is applied to the axles of the truck itself, but is transferred through the medium of a part of the truck, not only movable, but having the same amplitude of movement as the car body on its supporting springs.

Another form of making pivotal connection between a car and truck, and of the devices used for the purpose of transferring the propelling power, is where the drawing devices extend between the truck frame and the car body, the upper portion of the truck frame carrying the elements which connect with the car body, said frame having axle box pedestals, or housings, usually in the form of spring posts, about which the car supporting springs lie, the lower portions of the spring posts being tied together at the bottom and below the axle boxes by what is known in the art as a "pedestal tie bar." In this form should the power be applied directly to the axle of the truck, the propelling strain derived therefrom is transferred from the axle boxes directly to the spring posts, or pedestals, or through the medium of intervening elements, thence to the upper portion of the truck frame upon which the pivotal device are located, to the car; or should the car be directly drawn, the reverse distribution of power takes place. In this case, also, the power for propelling the truck, or the car, is not applied directly to the running gear, but through the intervention of intermediate elements which are movable as before stated.

Another generic form of device for pivotally uniting a car body and truck is where a peculiar truck element, known as "the axle box frame," is used, and upon which the pivotal truck devices are located, the usual top or upper chord of the truck being omitted. In this last form of truck the axles and wheels with their attached axle boxes are preserved in alignment, or for parallelism, by means of an axle box frame, which generally comprises two side bars having yokes or saddles, which embrace the sides of the axle boxes, and which form bearing surfaces for the same, which side bars may, or may not, be united laterally by cross bars extending between the ends of the side bars, or intermediate of their length. In this form of truck the usual truck frame having upper and lower chords with intermediate pedestals or housings for the axle boxes, and intermediate bracing, is dispensed with, and the pivotal devices and car supporting springs are located, or set directly, upon the axle box frame, and, so far as we are, or have been, acquainted with the art, directly upon the side bars of such a frame and between the two axles thereof. In this class of truck, also, the car supporting springs have a superimposed side bearing which makes pivotal connection with the car body solely for the purpose of confining the truck in its proper relation to the car body, but not for the purpose of drawing the same, or being drawn, the drawing devices being composed of parts extending from the car body to the side bearings, or pivotal connection, which has the same amplitude of movement as the car body upon the supporting springs, suitable guides or restraining devices being used for the purpose of preserving the relation of the car body and truck, and also for the purpose of transmitting the applied power to either. It is this last form of truck which we have utilized for the purpose of carrying out our invention, and in doing so we have dispensed with the upper or top chord and all intermediate or movable devices utilized for the purpose of connecting the truck and car for drawing purposes, and make such connections between the truck and car directly with the axle box frame, so that should the motive power be applied to the truck, the axle boxes themselves first receive the propelling force on its way to the car body, thence directly to the axle box frame, and from the axle box frame directly to the car; and considering the axle box frame for drawing purposes as a component part of the wheels and axles, the car is drawn directly through an inflexible drawing device, and not through a part of the truck which moves with car springs.

Another part of our invention consists in the construction of the drawing device.

Another portion of our invention consists in the use of independent and unconnected bearing bolsters, the truck bearings of which are spring supported directly from the axle box frame, and which when combined with segmental rub plates on the car body form the means for confining the car to the truck, or vice versa, and pivotally uniting them, at the same time spring supporting the car body on the truck.

Among the specific improvements herein set forth in regard to the bearing bolsters there is comprised means for permitting the same to have a motion fore or aft; that is, in line with the longitudinal center of the truck, and also a movement transversely of the truck, wherein elastic cushions, or abutments, are used for the purpose of relieving the parts from the strain due to sudden shock during such movements, which movements are entirely independent of the movement of the bolsters up or down on the car springs.

Another part of our present invention relates to the amplification of the traction of the truck other than that due to the applied motive power. In regard to this part of our invention it is old in the art to use wheels of varying diameter, one set being larger than the other, the weight of the car body being superimposed upon the larger wheels, or the motive power being applied directly to the axle of such larger wheels, or both the weight of the car body and the motive power being applied to the larger wheels, wherein a maximum traction has been either the object or the result. It has also been usual to place the larger, or driving, wheels at the end of the truck, where but two sets have been used, and the trailing wheels at the other end, they being smaller than the driving wheels, and devices (such as bearings on the car and the end of the truck opposing the driving wheels) have been used for the purpose of preventing the smaller wheels from climbing from the track, or pounding thereon, the disposition to do which has been superinduced by the preponderance of the weight of the car on the driving wheels, the propelling power being applied to the wheel at the opposing end of the truck. This particular part of our invention has for its object to so distribute the weight of the superimposed car that it will have a tendency to keep the smaller, or trailing, wheels down upon the track, which is accomplished through the location of the independent bearing bolsters, which take the weight of the car body directly to the wheels, adjacent to and but a short distance from the axle of the driving wheels, to which the power is applied; and to augment the tractive power of the wheels by locating the draw bar at a point without the wheel base (that is, the distance between the axle centers) and adjacent to the axle of the driving wheel. The effect of this location of the draw bar is to add to the friction of the driving wheels on the track, augmenting the traction thereof; and the bearing bolsters being located adjacent to the same axle, and transferring less than a maximum of the weight of the car to such wheels, the augmentation of the traction of the truck is increased, and the tendency of the trailing wheels to climb, or pound the track, is decreased, and this last without locating an end bearing between the trailing end of the truck and the car body.

In cases where the pivotal center is placed directly in the truck center the location of the car rub plates (such as shown herein) close to the driving axle and below the top of the wheel cannot be advantageously accomplished for the reason that the radiation of the car on the truck would cause the car rub plates to strike the wheel. In order to permit the car rub plates to clear the wheels truck bearings have to be raised. This increases the height of the car from the track and makes it necessary to use a number of car steps or to increase their height, neither of which is desirable; also, the location of the pivotal point in the center of the truck, or nearer one of the axles, (the truck bearings being set between the truck center and the axis of the opposing axle) the movement of the car about the wheels adjacent the truck bearings is increased, and enough room in the car flooring cannot be spared into which to set such wheel. The car body therefore has to be set up high enough on the truck to give sufficient clearance for radiation, which results as before stated.

It is well known that a low placed car body is much better mounted than a high placed one, and one of our objects in the present case is to get the car body as close to the axles as possible. The elimination of the upper chord permits of this in a measure, but we are able to get the car body as close to the axles as in the case of a non-pivotal or rigid truck, so that the driving wheels can extend up into the car body and into the usual wheel box. This we accomplish by locating the pivotal point anywhere between the truck center and axis of the driving wheel (or wheel adjacent the truck bearings), preferably close to the driving wheel axle, or over the same. The relative movement of the car on the truck in curving is then much less at the large wheel or driving end, and the car rub plates can be set so as to lie outside of the wheels and below their tops without coming in contact with the side of the wheels in curving or the edge of the wheel when the car works on the springs. In this way are we enabled to place the car so low down that the wheels at one end can extend up into the car, the advantages of which are well known to those skilled in the art.

By eliminating the end bearings the bearing points of the car and truck are reduced, and consequently the strain on the car structure, causing the car to ride easier on the truck. The absence of the upper chord reduces the height of the car from the axles, and cheapens the cost.

Our invention also comprises the details of construction hereinafter described, and fully pointed out in the claims.

In the drawings forming part of this specification, Figure 1 is a side elevation of our complete truck, showing a part of the car-body, certain portions of said view being in section; Fig. 2, a plan view of Fig. 1, the car-body being removed, the car rub-plates being shown in position; Fig. 3, an end elevation, partly in section, taken approximately on the line $xx$, Fig. 2; Fig. 4, an enlarged fragmentary view of a portion of the side beams, the car rub-plate, and truck side bearing, all in plan view; Fig. 5, a sectional elevation of the same with the addition of a car sill and the omission of a portion of the side beams; Fig. 6, a plan view, enlarged, of a portion of one end of the axle-box frame with the draw-head secured thereto; Fig. 7, a sectional elevation of the same on the line $y\ y$, Fig. 6.

Similar numerals of reference refer to like parts throughout the several views.

In the drawings 1 are the driving wheels and 2 the trailing wheels, the driving wheels being larger in diameter than the trailing wheels; 3, the axle for the driving wheels and 4, the axle for the trailing wheels.

The prominent feature of this truck is that both the drawing and pivotal devices are secured to or connected with that part of the truck frame which confines the axle boxes and axles in place and preserves the parallelism of the axles, which frame is supported entirely upon the axle boxes and does not move with the motion of the supported car body. This frame is what is termed an axle box frame, and it may have, though independently of the movement of the car on its springs, a slight movement up and down upon the axle boxes when it is elastically supported thereon. This frame comprises in the drawings the yokes 5 which embrace the axle boxes of the axle of the driving wheel, and the yokes 6 which perform a like function in regard to the axle boxes for the trailing wheel axle. The axle box frame is rectangular in plan and comprises the cross bars 7, 8, extensions 9, 10 and central sections 11. The axle box frame in its entirety is of wrought iron made into one homogeneous piece of metal, and by reason of the difference in dimension of the wheels, the axle boxes are located at different heights, and the frame is so conformed as to properly locate the yokes which bear against the sides of the axle boxes and embrace them, so that, as shown, the yokes are so related to the main web of the frame that the line of the axle will be about central in the yokes, the extension 9 and cross bar 7 being higher than the rest of the frame.

The strap braces 12, 13 bent into suitable form, as shown, are secured to the axle box frame through pins or bolts 14, 15, so as to brace the frame sections about the yokes.

One of the prominent features of this truck lies in securing the truck to the car body for the purpose of enabling it to propel the car, or the car to draw it, by devices which permit of the movement of the same laterally of the truck or car in the arc of a circle. To this end we secure what we term a draw head 16 by means of the lugs 17 and bolts 18 to the cross bar 7 of the axle box frame which lies without the wheel base and forward of the driving wheels. This draw head is provided with a segmental channel 19 having the pivotal center of the truck (which is encompassed within a circle 20, Fig. 2) as a center, said channel being formed by the two upright segmental walls 21. The bottom of the channel is provided with a segmental slot or opening 22 of any desired size. Apertured lugs 23 are formed on the extremities of the draw head and at each side of the channel, centrally, one of the lugs lying over the cross bar 7, as shown in Figs. 6 and 7, by means of which it can be secured to said cross bar by nuts in addition to those shown at 18, and at the same time assist in securing a restraining plate 24, Figs. 3 and 7, by the additional nuts 25, the plate being provided with a segmental slot $25^a$. A roller 26 having a central aperture rests on the segmental ledge 27 formed by cutting the slot 22 in the channel. This roll is adapted to bear against either the front or back wall 21 and to move within the channel 19, and it may have a free fit, as indicated in Fig. 6, to enable the bolsters, to be described, to have a longitudinal movement, fore and aft, on the axle box frame.

Connection between the truck and the car body is made as follows: At 28 are the longitudinal sills of the car and 29, 30 some of the cross sills. Secured to the cross sill 30, which happens to be the one located over the draw head 16, is an inflexible draw bar 31, the upper portion of which is bent into a flat plate 32, through which pass the bolts 33 for securing the bar to the cross sill 30, a plate 34 of iron being preferably interposed between the draw bar plate 32 and the sill for the more perfect securement of the bar thereto.

By reference to Figs. 6 and 7 it will be noticed that the lower portion of the draw bar 31 is cylindrical (the upper portion not being of necessity so) and passes through the roller 26, the union being such that the draw bar 31 can play vertically up and down within the roller to allow for the play of the car on its springs, a pin 31$^a$ being used to prevent the disengagement of the bar and draw head.

To strengthen the lower part of the draw bar we provide it with two diagonal braces 35, preferably forged thereon as shown, which lead up to and are secured by the bolts 36, or otherwise, to the cross sill 29.

From the foregoing it will be seen that the car and truck are united for drawing purposes by devices which permit of the car and truck vibrating in relation to each other, which devices are carried bodily by the car or truck in their swiveling movement, and that the truck can be propelled either from power applied to the car or vice versa, the drawing connections being secured without the wheel base and forward of the driving wheels.

Instead of the radial plate being secured to the cross bar 7 of the axle box frame, it can be secured to the cross sill 30 in the same manner as it is secured to said cross bar, as shown in the application of Walter S. Adams, Serial No. 527,954, filed November 5, 1894, to which cross-reference is made, a plate of iron being interposed between the sill and the radial plate as is usual in joining iron and wood, the draw bar 31 being inverted and secured to the cross bar 7 through the medium of a lug formed thereon, the braces 35 extending downwardly and being secured to the cross bar 7 by bolts as shown in dotted lines in said application.

Thus far we have described the means for positively uniting the car and truck for the purpose of drawing or propelling the same. We shall now proceed to describe the means for supporting the car upon the truck, the means of permitting pivotal or swiveling action between them, and the peculiarity of the arrangement of the parts.

The truck side bearings, which comprise the casting 40 and a roller 41 mounted transversely within a cavity in the casting and extending from without the same, which roller is rotatably mounted upon a spindle 42, itself preferably rotatably mounted in bearings in the casting to reduce the friction, are supported upon the spring posts 43 which are set in the axle box frame adjacent to the axle of the driving wheels and preferably between the wheel base center of the truck and said axle, a portion of the axle box frame forming both a pedestal and guide for the spring posts. The spring posts have enlargements 44, and 45 upon which the side bearing 40 rests and to which it is rigidly or movably secured, and when rigidly secured, the ears 47 are apertured, through which passes a screw threaded extention 47$^a$, (dotted lines, Fig. 1) making a shoulder, upon which the bearing rests, the fixture being made by the nuts 48. The lower parts of the spring posts are reduced in diameter and form guide posts 49, the union of the enlargements 44, 45 and guide posts forming a shoulder 50. Best seen in Fig. 5. The top of the bearing is provided with a rectangular cavity 51, in which is located a friction plate 52 of suitable metal. The bearings are of the form shown in a patent granted to us March 7, 1893, No. 493,234, to which cross reference is made. For guiding the upper portion of the spring posts in their movements up and down, and for bracing and holding them in position at this point, the axle box frame is provided with the guide arm or pedestal 53 which is provided with a series of apertures, as at 54, Fig. 1, in dotted lines, through which the enlargements of the spring posts pass. This arm is derived from and preferably made integral with the yokes 5, and preferably extends flush with the top thereof.

In Fig. 1 the post spindles 49 pass through apertures in the side section 11 of the axle box frame, which apertures preferably allow a small longitudinal and lateral play therein, the bottom of the spindles being tied together by the cross or tie bar 56 held on to the spindles by the nuts 57.

Interposed between the guide arm and the axle box frame are the car springs 58 of spiral form and which surround the spring post spindles 49, below and above which lie the spring caps and plates 59, 60, and through which the spring post spindles pass. The shoulder 50 on the spring posts bears upon the spring caps and the plates 60 lie on the axle box frame, which may be enlarged to properly seat them. The car bearings or rub plates comprise the segmental angle iron 61, the depending face of which is disposed in the arc of a circle, the center of which lies within the point 20, Fig. 2, (which is the pivotal center of the truck) the longitudinal or top plate 62 of which is secured to one of the longitudinal or side sills 28 of the car, the top plate having an additional frictional plate 63 fast thereto which is adapted to bear upon the friction plate 52, the roller 41 bearing against the vertical side as shown in Fig. 5.

As seen in Fig. 1, the enlargements 44, 45 and spindles 49 are capable of a movement within their respective guides and braces, both longitudinally and laterally of the truck. This arrangement will permit the car body to have a movement, as before set forth, in relation to the truck or vice versa, the union of the draw bar and roller 26 with the channel in the drawhead 16 permitting a like movement, as shown more clearly in Fig. 6.

The foregoing comprises what we term the independent and unconnected bearing bolsters, as they form the truck element of the pivotal devices, the bearings being supported by a bolster which performs the same function, in this regard, as does the usual truck center bearing bolster, each bearing bolster being entirely independent of and transversely disconnected from the bolster on the opposing side of the truck, pivotally securing the car and truck without mechanical connection with the point about which the car or truck moves, and securing this relation without connection with the other.

From the foregoing it will be clear that the drawing devices, whether the radial plate or roller are affixed to the car or truck, can be used with either of the forms of bearing bolster shown and described, they being all capable of conjoint use so far as the substance is concerned.

Wherever, in the foregoing specification we have used the words "wheel base" we mean the distance between, or space comprised within, the points of contact of the front and back wheels with the rails.

By "drawing devices" we mean the elements which make a positive engagement with the truck and car and which positively draw either, and which do not of necessity support the car on the truck; and by "pivotal" or "swiveling" devices we mean those elements which positively support the car on the truck and which permit a movement of one in relation to the other.

We do not limit ourselves, as to the drawing devices, the pivotal devices, and the details of construction of either, to their use in trucks having wheels of varying diameter, nor where the pivotal point is disposed away from the actual truck center, as their use in trucks having wheels of the same diameetr throughout, and the pivotal point in the actual center of the truck, will not work a departure from the spirit of our invention.

Many changes and modifications may be made in the present structure without departing from the spirit of our invention.

Having described our invention, we claim—

1. The combination, in a car body, of the pivotal truck having an axle box frame and yokes therein, large driving wheels at the forward and smaller trailing wheels at the rear end of said frame, both sets being journaled in the yokes at opposite ends of the frame, bars above the frame extending rearwardly from the upper part of the forward yokes, bearings sustained above said bars by posts passing through said bars, springs supporting the posts on said frame below said bars, rub plates on the car engaging said bearings, a transversely disposed and segmentally slotted draw head secured to said frame forward of the driving wheels, and a vertically disposed draw bar on the car passing through said slot, substantially as described.

2. The combination, with the car, a truck and its frame of the draw head located adjacent one set of the truck wheels having a segmental slot, a roller in and controlled by the slot, a draw bar adjacent said set of wheels controlled by the roller in the slot of the draw head, passing through the roller and vertically movable therein, transversely disconnected swing-bearing bolsters adjacent said set of wheels, springs supported on the side bars of the frame, bearings on the bolsters, and rub plates and curved restraining plates on the car engaging the bearings, substantially as described.

3. The combination with a truck having a frame for supporting a car body and preserving the parallelism of the axles, said frame being supported upon the axles and having longitudinal side beams and axle box yokes, and spring supported bearing bolsters carried by and adapted to have a movement in said side beams either transversely or longitudinally, said movement being independent of that of the bearings on the car springs, a car body, and car rub plates for engagement with the said bearings, substantially as described.

4. The combination in a truck having a frame comprising longitudinally disposed side bars supported upon the axles of the truck, and car bearing bolsters supported upon said side bars, said bolsters being adapted to have a movement longitudinal, fore and aft, of the frame, substantially as described.

5. The combination in a truck having side bars and connected yokes supported upon the axle boxes of the truck, transversely disconnected bearing bolsters supported upon the side bars, and a plurality of guides for the movements of the bolsters upon the side bars, each of said guides being derived from one of the yokes, substantially as described.

6. The combination, with an axle box frame, and a car body frame, of the slotted and channeled draw head secured to one of said frames, an apertured roller moving in said channel, a slotted plate inclosing said roller, and a draw bar secured to the other frame and passing through said slot and movably through said roller, substantially as described.

7. The combination of a car body and an axle box frame having rearward extensions from each of the axle box yokes, two of said extensions being disconnected, of springs between the extensions, and side bearings for supporting the car body resting on said springs, substantially as described.

8. The combination, with a car body, and an axle box frame having upper and lower extensions from one pair of axle box yokes, the upper extensions being disconnected, of springs supported on one of said extensions, and side bearings for supporting the car body resting on said springs, substantially as described.

9. An axle box frame having the central sections 11, the yokes 5 extending above the central sections, and the non-continuous arms 53 extending from the upper portions of the yokes in the same directions as the central sections, substantially as described.

10. The combination, with the draw bar 31, of the draw head having a segmental slot 19, the shoulders 27, the segmental slot 22 between the shoulders, the apertured roller 26 within the slot 19 and about the draw bar, and normally resting on the shoulders 27, substantially as described.

11. The combination, with the slotted drawhead having the apertured lugs or ears 23, of the slotted plate 24 having apertures aligning with those in the head, and bolts 25 for securing the head and plate together, substantially as described.

12. The combination, with the side bearing, of the shouldered spring posts, a support for the posts, the springs 58 about the posts and between the shoulder and support, and a bar 56, uniting the ends of the posts, substantially as described.

13. The combination, with the side bar 11, the yoke 5, of the bar 53 extending from the top of the yoke, the posts 44 passing through the bar 53 and the side bar, the bearing 40 above the bar 53 securing the ends of the posts together, shoulders 50 on the posts lying within the bar 53, springs 58 about the posts and between both bars, a plate 59 between the top of the springs and the shoulders, and a cross or tie bar, 56 for securing the ends of the posts together, substantially as described.

14. The combination, with the bearing 40, of the guide bar 53, apertures therein, a bushing in said apertures, spring posts secured to said bearing and passing through the bushings and means for guiding the lower part of said posts, substantially as described.

15. The combination, with the bar 53, apertures therein an elastic abutment within the apertures, of the bearing 40, the spring posts passing through the abutment, and means for guiding the lower ends of said posts, substantially as described.

16. The combination, with the bar 53, the apertures therein, an elastic ring 65 within the apertures, bushings 64 within said ring, of the bearing 40, the spring posts secured thereto and passing through the bushing, and means for securing the lower ends of the posts together, substantially as described.

17. The combination, with the bar 53, of the aperture therein, the elastic ring 65 within the aperture, the bushing 64 within the ring, the detachable apertured plate 65ª for retaining the ring and bushing in place, the bearing, the post attached to the bearing and passing through said bushing and plate, and means for guiding the end of said post, substantially as described.

Signed at Philadelphia, in the county of Philadelphia and State of Pennsylvania, this 11th day of February, 1893.

JOHN A. BRILL.
WALTER S. ADAMS.

Witnesses:
HENRY C. ESLING,
JNO. T. DUNLAP.